US008627069B2

(12) United States Patent
Clermont et al.

(10) Patent No.: US 8,627,069 B2
(45) Date of Patent: Jan. 7, 2014

(54) SYSTEM AND METHOD FOR SECURING A COMPUTER COMPRISING A MICROKERNEL

(75) Inventors: Nicolas Clermont, Rambouillet (FR); Francis Hauguet, Montigny le Bretonneux (FR); Guillaume Meier, Paris (FR)

(73) Assignee: EADS Secure Networks, Elancourt (FR)

( * ) Notice: Subject to any disclaimer, the term of this patent is extended or adjusted under 35 U.S.C. 154(b) by 147 days.

(21) Appl. No.: 12/936,908

(22) PCT Filed: Apr. 8, 2009

(86) PCT No.: PCT/FR2009/050623
§ 371 (c)(1),
(2), (4) Date: Oct. 7, 2010

(87) PCT Pub. No.: WO2009/136080
PCT Pub. Date: Nov. 12, 2009

(65) Prior Publication Data
US 2011/0035586 A1    Feb. 10, 2011

(30) Foreign Application Priority Data
Apr. 8, 2008  (FR) ..................................... 08 52336

(51) Int. Cl.
*H04L 29/06* (2006.01)
*G06F 21/00* (2013.01)

(52) U.S. Cl.
USPC .............................. 713/164; 726/17; 726/27

(58) Field of Classification Search
None
See application file for complete search history.

(56) References Cited

U.S. PATENT DOCUMENTS

| 2006/0256105 | A1  | 11/2006 | Scarlata |
| 2006/0294517 | A1  | 12/2006 | Zimmer |
| 2008/0016313 | A1* | 1/2008  | Murotake et al. ............. 711/173 |
| 2008/0163370 | A1* | 7/2008  | Maynard ........................ 726/22 |

FOREIGN PATENT DOCUMENTS

WO    WO 2007/050797 A    5/2007

OTHER PUBLICATIONS

Fraser K et al: "Safe Hardware Access with the Xen Virtual Machine Monitor" Internet Citation, [Online] XP002370809 Retrieved from the Internet: URL:http://www.cl.cam.ac.uk/{akw27/papers/safehw-oasis04-final.pdf> [retrieved on Mar. 7, 2006] the whole document.
Barham P et al: "Xen and the Art of Virtualization" Proceedings of the ACM Symposium on Operating Systems Principles, XX, XX, Oct. 1, 2003, pp. 164-177, XP002298786 sections 3.3.1 and 3.3.2.

(Continued)

*Primary Examiner* — Gilberto Barron, Jr.
*Assistant Examiner* — Izunna Okeke
(74) *Attorney, Agent, or Firm* — Gardere Wynne Sewell LLP; Andre M. Szuwalski

(57) ABSTRACT

A method of securing a computer comprising a microkernel and a system for interfacing with at least one virtualized operating system are presented. The microkernel includes a clock drive, a scheduler and an inter-process communication manager. The system for interfacing forms at least one virtual machine associated with each operating system and allows execution of the latter without modification. The method includes, at the level of the system for interfacing, the steps of:—intercepting any communication between a means external to the operating system and the operating system,—verifying that predefined rules of access to said external means are validated by said communication;—transmitting the communication to the recipient if the rules are validated.

15 Claims, 1 Drawing Sheet

(56) References Cited

OTHER PUBLICATIONS

Xiaoqi Lu, Scott F. Smith: "A microkernel virtual machine: Building security with clear interfaces" Conference on Programming Language Design and Implementation; Proceedings of the 2006 Workshop on Programming Languages and Analysis for Security, 2006, pp. 47-56, XP002510783, Ottawa, Ontario, Canada, the whole document.

International Search Report mailed on Dec. 4, 2009 for PCT/FR2009/050623 filed Apr. 8, 2009, together with its English translation.

* cited by examiner

SYSTEM AND METHOD FOR SECURING A COMPUTER COMPRISING A MICROKERNEL

PRIORITY CLAIM

This application is a 371 filing from PCT/FR2009/050623 filed Apr. 8, 2009 which claims priority from French Application for Patent No. 08-52336 filed Apr. 8, 2008, the disclosures of which are hereby incorporated by reference.

TECHNICAL FIELD

This invention relates to a system and a method for securing a computer comprising a microkernel. It likewise relates to a computer program product implementing the method.

BACKGROUND

Conventional operating systems such as Microsoft Windows, GNU/Linux or the like were not designed with strong security constraints. The result is weakly secured design in the form of a two-layer operating system: the first layer consists of the kernel run in a privileged mode and the second layer consists of the applications which are run in an unprivileged mode called the user mode. The kernel is typically a monolithic kernel, even if a modular approach is chosen for managing in particular all of the resources offered by the operating system. The kernel includes the low-level software such as the scheduler, the process manager, the memory manager as well as the peripheral drivers and some high-level services such as the file systems, the network stacks, the encryption algorithms, etc.

Accordingly, the kernel comprises millions of code lines with a proportional number of bugs and security flaws. It cannot therefore be verified as compliant with the specifications using the current code verifiers and official proof systems. In addition, they have poor isolation properties. As a matter of fact, the user processes can break the isolation in various ways owing to the tubes, the files, the shared memory, etc. Management of the inter-process communications is not reliable. Furthermore, there is no isolation inside the kernel, or between sub-systems of the kernel, e.g., such as between the drivers and the network stacks. Thus, a bugged or corrupt hardware component driver can endanger the entire system.

As security risks increase, kernel designers have attempted to secure the existing kernels by adding mandatory access managers (Mandatory Access Control—MAC) with a small granularity for implementing the "Reference Monitor" concept. As a matter of fact, current operating systems generally implement Discretionary Access Control (DAC), which cannot solve the generic problem of malicious codes, and especially viruses. Examples of operating system security enhancements are SELinux, GRSecurity, AppArmor, RSBAC, SEBSD, etc.

However, these implementations do not meet the requirements of the Reference Monitor because the security functions forming part of the kernel are not protected and are unusable within the kernel domain: they do not offer any protection between sub-systems of the kernel. Furthermore, since these kernels manage all of the system resources, it is difficult to establish a security policy, and the result is complex, in terms of configuration and management, thereby making official verification impossible.

All of these weaknesses make official verification of the protection offered by these operating systems impossible and produce a number of security threats which limit the use of these systems in environments having a high security requirement. Furthermore, the kernel memory space is shared amongst all of the processes, and with all the sub-systems, even if they belong to different security levels. Consequently, the current operating systems do not offer a healthy and secure environment.

As a reaction to the complexity of current monolithic kernels, researchers have proposed the concept of a microkernel, which is characterized by the movement of a maximum number of services outside the kernel, into the user space. These functionalities are then provided by small independent servers possessing their own address space.

The microkernel is thus limited to a few basic functions including management of the communications between the servers, which are carried out via message transfer (IPC-Inter Process Communication). In addition to this management, a microkernel includes a clock driver and a scheduler.

Thus, while a traditional monolithic kernel comprises several million lines of code, a microkernel generally comprises less than 20,000 lines of code.

The attraction of secure system designers for microkernels is thus understood, since they are of a size which enables them to be easily maintained and they can be specifically verified. They can thus be certified at the highest level, EAL7, of the Common Criteria.

One of the most widely known and currently used microkernels in various alternatives is the L4 microkernel designed and implemented by Jochen Liedtke.

However, along with the microkernel itself, it becomes necessary to develop the necessary servers for the system to offer the functionalities expected from a modern operating system.

Therefore, in order to avoid complete rewriting of an operating system, it has been proposed to use the microkernel as a virtualization hypervisor base on which one or more traditional operating systems are run. As a matter of fact, a microkernel and all of the management servers required for partitioning the resources natively perform the function of a hypervisor, namely that of partitioning the available resources between the virtual machines and emulating hardware events (they do not comprise the peripheral drivers, only non-shareable system buses), thereby offering a high-performance native virtualization technology, also known as "system" level.

It is in this way that the L4 Linux project of the University of Dresden (Germany) brought the Linux kernel over to the L4/Fiasco microkernel and the layer of services thereof, thereby creating a (para) virtualized LINUX running on top of a hypervisor, in a completely unprivileged mode, in user mode.

In terms of security, such a system benefits from the reliability of the microkernel. However, the security of the servers likewise depends on the reliability of the IPC communications, because it is a possible means of transmitting harmful data. Such being the case, for reasons of efficiency, communications security management is traditionally left to the servers, the microkernel being content with transmitting the messages. The microkernel can, however, offer a communication rights mechanism; two tasks can communicate with one another only if they have the appropriate rights. In the opposite case, the communication is redirected to a specific communications control server which will authorize or not authorize the communication "on-the-fly", based on the security policy.

In addition, current microkernel architectures are such that security policy is "hardwired" into the access rules of the microkernel whereby, even in a virtualization context with several virtual machines, they all have the same security policy.

It would thus be particularly advantageous to have secure microkernel architecture which enables good control of virtual machine access as well as granularity and flexibility in the implementation of one or more security policies with regard to a single system.

SUMMARY

Therefore, according to a first aspect of the invention, a method for securing a computer comprises a microkernel and interface means with at least one virtualized operating system, said microkernel comprising a clock driver, a scheduler and an inter-process communication manager and said interface means forming at least one virtual machine associated with each operating system and enabling the running thereof without modification.

At the level of the interface means, the method comprises the steps of:
  interception of all communication between a means external to the operating system and the operating system,
  verification that the predefined rules of access to said external means are validated by said communication; and
  transmission of the communication to the recipient, if the rules are validated.

According to other characteristics and embodiments, the external means comprise means of storing secret cryptographic data and any transmission of secret cryptographic data is secured prior to storage.

According to a second aspect of the invention, a computer program product comprises program instructions for implementing the preceding process when they are executed on a computer.

According to a third aspect, a system for securing a computer comprising a microkernel and interface means with at least one operating system, said microkernel and said interface means forming at least one virtual machine associated with each operating system and enabling the running thereof, is such that the interface means comprise mediators customized for intercepting any communication between a means external to the operating system and the operating system and to transmit said communication to its recipient only if the predefined rules of access to said external means are validated by said communication.

BRIEF DESCRIPTION OF THE DRAWINGS

The invention will be better understood upon reading the following description given for illustrative purposes only, and made with reference to the appended drawings, in which.

DETAILED DESCRIPTION OF THE DRAWINGS

Figure 1:
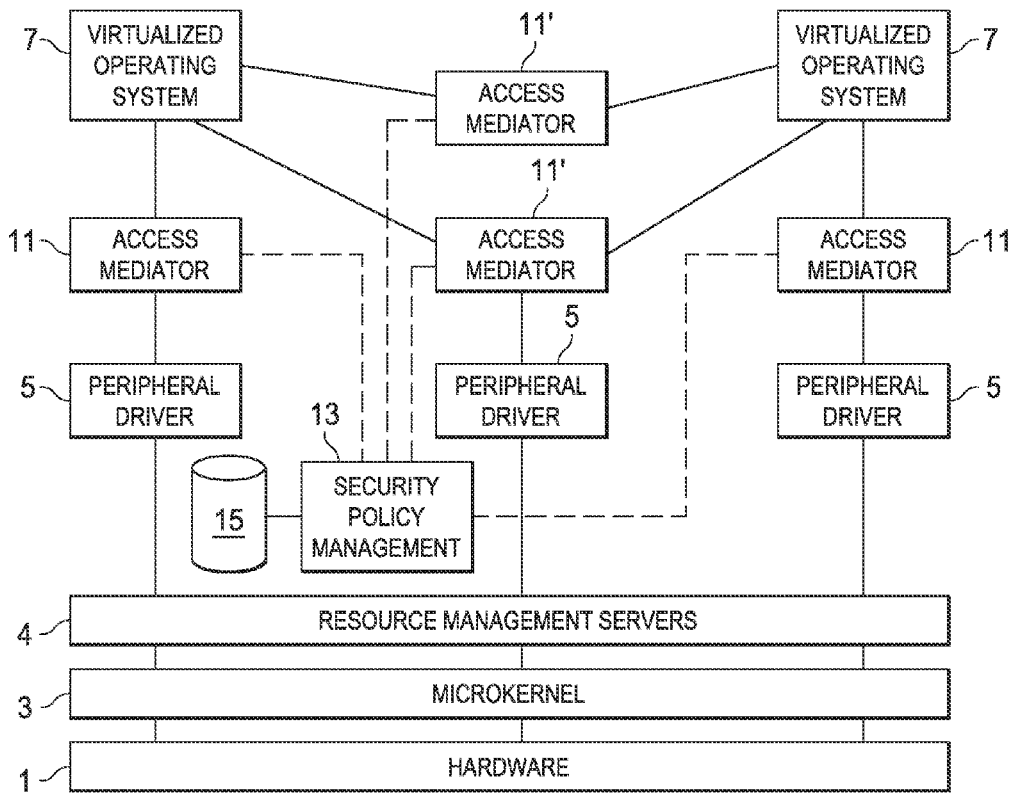
FIG. 1 is a schematic view of the software layers of a computer comprising a virtualization software.

With reference to FIG. 1, besides the hardware shown symbolically by layer 1, a computer conventionally comprises a microkernel 3. This microkernel 3 manages a portion of the hardware directly, namely the processor, the memory controllers, the interrupt controller and the clock driver. The various resource management servers, symbolized by layer 4, run on top of the microkernel 3, each being responsible for managing a sub-set of kernel objects of a given type. To reach the maximum level of security, a resource-type management server is assigned per security domain (e.g., a physical memory manager per level, each possessing distinct memory areas). The management servers 4 set forth an interface to virtualized operating systems 7, enabling access to the managed resources. Peripheral drivers 5 are responsible for managing a peripheral and are closely linked to an access mediator 11, 11'. The mediator 11' is responsible for multiplexing access to the peripheral between several concurrent systems, whereas the mediators 11 are responsible for applying specific processing to each system (encryption . . . ). In particular, the mediators 11, 11' provide a virtual peripheral to the virtualized operating system 7. All of the interfaces set forth by the mediators, on the one hand, and the resource managers, on the other hand, comprise a "virtual machine". The mediators 11, 11' comprise security rules which are defined in a security policy management module 13 and stored in storage means 15.

In this description, the term operating system is given a broad meaning which includes an operating system per se, such as the Microsoft Windows, Inc. operating system or the Linux system, as well as all of the applications which are run on this operating system.

In the described embodiment, the operating system 7 is enclosed in a "cage" consisting of the virtual machine and, in particular, the mediators 11. 11'. In this way, for example, any display request by the operating system 7 passes through a display mediator. In the same way, the network stream passes through a network mediator, etc.

The mediators 11, 11' are connected to the corresponding peripheral drivers 5 conventionally in charge of controlling the hardware.

Figure 2:
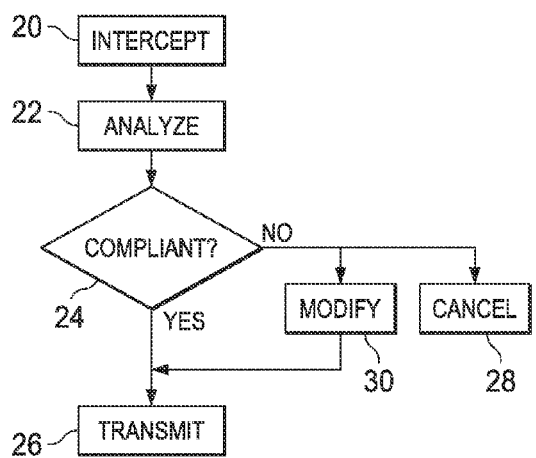
FIG. 2 is a flow chart of a securing method according to an embodiment of the invention.

The operation is then as follows, with reference to FIG. 2.

Each time that information is transmitted between the operating system 7 and a driver 5 or another element external to the operating system 7, the corresponding mediator 11, 11' intercepts the flow of information, in step 20.

Then, this flow is analyzed in step 22, based on the predefined rules of access. If, in step 24, the flow is compliant with these rules, it is normally transmitted to the recipient thereof at 26.

On the other hand, if this flow is not compliant with at least one of these rules, it is cancelled in step 28, i.e., the recipient does not receive the flow and the sender optionally receives a transmission error message, or else it is modified at 30 prior to be transmitted at 26 to the recipient. The purpose of the modification is to validate the flow with respect to the rule or rules violated by the flow in the initial state of same.

Several types of mediators can be defined based on the type of filtering and/or associated hardware component.

For example, a first type of mediator is defined for the hardware resources shared by several operating systems, each of said systems being run in a virtual "cage". For example, a machine generally possesses a single network card. It is then necessary to share the use thereof amongst the various virtualized operating systems, in order to give each one access to the network.

In this way, a driver is defined in the virtualization layer consisting of the microkernel and management servers, and the corresponding mediator controls all accesses. In the case of the network card, each operating system receives its own MAC address via the mediator. In this way, a data packet being input onto the physical interface is managed by the driver. The mediator of the network card acts as a virtual bridge by transmitting the packet to the operating system. It is likewise possible to ensure that the outgoing packets are not tampered with by the operating system, e.g., by modifying the source MAC address.

Another example relates to access to the disks. For example, if the virtualized operating system has received the first partition of the first disk as storage space, access to the other partitions will be rejected by the mediator linked to the storage driver.

Conventionally, communication between two virtualized operating systems on a single machine is carried out by means of a virtual network access managed entirely by the virtualization software. In this way, each operating system transmits information to the other as if the second operating system were on a different machine connected via a data network.

A second type of mediator is associated with these virtual network peripherals in order to ensure that only authorized communications are possible. Depending on the established security policy, the mediator then acts as a firewall by blocking unauthorized traffic, or else, encrypts the communications in order to transmit same to an operating system operating at another level of security.

A third type of mediator supports cryptographic functions by preventing the disclosure of secrets in an unsecure environment. It is thus possible to entrust sensitive operations to another unsecured operating system.

For example, sensitive data having to be stored in encrypted form only is transmitted by the operating system to the storage driver in order to be written onto a hard drive. The corresponding mediator intercepts the data transmission, encrypts same with a key known to them alone and transmits same as encrypted to the storage driver. In this way, the encryption key is never "disclosed" to the unsecured operating system.

The mediators advantageously enable a level of security to be defined for each operating system.

Since the microkernel associated with the mediators is much less complex that an operating system, it is easier to write a secure virtualization software capable of being proven as correct.

In this way, the isolation of each operating system on the virtual machine thereof with the appropriate level of security enables a level of security to be obtained which is at least equal to that obtained by using separate machines.

In addition, it is possible to define a security policy by defining the actions and communication authorized for each level of security. This includes the assignment of a device, the use of a shared resource, the authorized communications, the constraints for exporting/importing data of the associated protection domain.

By centralizing management of the security policy in a specific module and by decentralizing the implementation of these rules by each mediator, it is thereby possible to guarantee obtainment of a consistent and upgradeable level of security.

As a matter of fact, the security policy is implemented by the mediators via the security rules. It is therefore possible to have dynamic policies by disseminating new rules to the mediators, for example, in order to counteract a specific attack, and without affecting the other levels of security.

It is understood that extensive use of the mediators enables the virtualized operating systems to be "caged". As a matter of fact, by installing a mediator at each point of connection, all of the flows of information, either incoming or outgoing, are filtered by the mediators. In this way, since the mediators are reliable software packages which enforce a security policy, a virtualized operating system can do nothing more than what is specified in the security policy. Otherwise, the operation is rejected.

This enables the operating systems to be run without any particular privilege, in particular without Input/Output or instruction privilege.

Furthermore, the "caging" is transparent for the virtualized operating system because it cannot distinguish between a flow coming from a mediator and a flow coming from a hardware device. This enables additional security processing of the flows in order to protect operating system data without involving same. For example, an antivirus mediator can scan the contents of a USB flash drive prior to installing it on the operating system.

The mediators can be concatenated to one another, thereby advantageously enabling several operations to be executed on a flow.

For example, in order to write on the USB flash drive, it is possible to concatenate an antivirus mediator and then an encryption mediator.

In this way, it is possible to advantageously obtain physical security by protecting sensitive data belonging to various security domains on a single physical medium.

Another advantage is that the protection applies without having to modify or involve the operating system, whether it be for protection or for configuration purposes. In this way, the virtualized operating system does not need to be configured for security, the configuration of same being ensured by the security policies implemented by the mediators.

The operating system is configured upon boot-up by the mediators, which determine the rules of access and implement the policy while running.

As a matter of fact, the security policy can be structured according to mediator class rules, which has the advantage of enabling high modularity: the implementation of a particular class of mediators is substitutable, without having to overwrite the entire security possible; only the rules relating to a particular class must be rewritten. In the same way, modifications can be made dynamically, i.e., during the run time, only with regard to specific mediators, relating solely to specific domains, without impacting the protection of the other interfaces or domains.

Thus, platform administration writes access rules for each mediator, specifying the authorized clients, and the allocated resources as well as the associated actions. All of the configuration files for the mediators are then combined into a single security policy file. To start a new virtual operating system or domain, the loader starts by searching in this file for the mediators which have this domain as a client, and it then authorizes the communications of this domain only with these mediators.

The operating system cannot override the mediators and therefore the security policy. Then, independently of one another, the mediators apply the access rules defined for this domain to these objects.

It is understood that various alternatives are obtainable from this description.

The invention claimed is:
1. A computer system, comprising:
a microkernel,
a first and a second virtualized operating system,
a plurality of peripheral drivers supported by the microkernel, and
an access mediator associated with each peripheral driver and coupled to the first and second virtualized operating systems, said microkernel comprising a clock driver, a scheduler and an inter-process communication manager, and said access mediators forming a first virtual machine associated with the first virtualized operating system and a second virtual machine associated with the second virtualized operating system, each access mediator functioning to multiplex first and second virtualized operating system communication access to an associated one of the peripheral drivers and customized to intercept any communication between the peripheral driver and a multiplexed one of the first and second virtualized operating systems and to permit transmission of said intercepted communication if the intercepted communication is compliant with security rules of access specifically defined for the multiplexed one of the first and second virtualized operating systems.

2. The system of claim 1, wherein the peripheral driver is a driver for a memory configured for storing sensitive data and wherein the access mediator is further operable to encrypt the intercepted communication with an encryption key known only by the access mediator and the multiplexed one of the first and second virtualized operating systems prior to storage in said memory.

3. The system of claim 1, further comprising an additional access mediator interconnecting the first and second virtualized operating systems and customized to enable transmission of the intercepted communication between the first and second virtualized operating systems if the intercepted communication is compliant with security rules of access specifically defined for the communications between the first and second virtualized operating systems.

4. The system of claim 1, wherein a security policy is defined for each of the first and second virtualized operating systems in the form of a set of access rules for implementation by the access mediators.

5. The system of claim 4, wherein access rules associated with the security policy for the first and second virtualized operating systems are provided to the access mediators prior to booting up said first and second virtualized operating systems.

6. The system of claim 1, further comprising a MAC address assigned by the access mediator to each of the first and second virtualized operating systems, said access mediator further configured to ensure that communications originated by the first and second virtualized operating systems utilize the assigned MAC address of the originating one of the first and second virtualized operating systems.

7. The system of claim 1, wherein the peripheral driver is a driver for a disk storage device having a storage space partitioned into a first partition associated with the first virtualized operating system and a second partition associated with the second virtualized operating system, said access mediator for the disk storage device peripheral driver further customized to reject the intercepted communication of the first virtualized operating system if the communication is for access to the second partition, and vice versa.

8. A method of securing a computer, wherein the computer comprises:
a microkernel comprising a clock driver, a scheduler and an inter-process communication manager;
a first virtualized operating system;
a second virtualized operating system;
a plurality of peripheral drivers supported by the microkernel;
an access mediator associated with each peripheral driver and coupled to the first and second virtualized operating systems, said access mediators forming a first virtual machine associated with the first virtualized operating system and a second virtual machine associated with the second virtualized operating system;

said method comprising the following operations performed at each one of the access mediators:
multiplexing first and second virtualized operating system communication access to an associated one of the peripheral drivers;
intercepting communications between the peripheral driver and a multiplexed one of the first and second virtualized operating systems;
verifying that the intercepted communication is compliant with security rules of access specifically defined for the multiplexed one of the first and second virtualized operating systems; and
permitting transmission of the intercepted communication if the intercepted communication is compliant with the defined security rules of access.

9. The method of claim 8, further comprising assigning through the access mediator a MAC address to each of the first and second virtualized operating systems and ensuring that communications originated by the first and second virtualized operating systems utilize the assigned MAC address of the originating one of the first and second virtualized operating systems.

10. The method of claim 8, wherein the peripheral driver is a driver for a disk storage device having a storage space partitioned into a first partition associated with the first virtualized operating system and a second partition associated with the second virtualized operating system, said method further comprising the following operations performed at the access mediator for the disk storage device peripheral driver:
rejecting the intercepted communication of the first virtualized operating system if the communication is for access to the second partition, and vice versa.

11. The method of claim 8, wherein the peripheral driver is a driver for a disk storage device having a storage space, and wherein permitting transmission comprises:
identifying the intercepted communication from the first virtualized operating system as including sensitive data for storage on the disk storage device;
encrypting the intercepted communication with an encryption key known only by the access mediator and first virtualized operating system; and
passing the encrypted communication to the disk storage device peripheral driver.

12. The method of claim 8, wherein the computer further comprises an additional access mediator interconnecting the first and second virtualized operating systems, the method further comprising the following operations performed at the additional access mediator:
intercepting communications between the first and second virtualized operating systems;
verifying that the intercepted communication is compliant with security rules of access specifically defined for the communications between the first and second virtualized operating systems; and
permitting transmission of the intercepted communication if the intercepted communication is compliant with the defined security rules of access.

13. The method of claim 8, further comprising, in a preliminary step, defining a security policy for each of the first and second virtualized operating systems in the form of a set of access rules for implementation by the access mediators.

14. The method of claim 13, further comprising providing the set of access rules associated with the security policy to the access mediators prior to booting up said first and second virtualized operating systems.

15. A computer program product implemented on a non-transitory computer readable medium and including program code instructions recorded on a computer-readable medium an executable on a computer, said computer comprising:
- a microkernel comprising a clock driver, a scheduler and an inter-process communication manager;
- a first virtualized operating system;
- a second virtualized operating system;
- a plurality of peripheral drivers supported by the microkernel;
- an access mediator associated with each peripheral driver and coupled to the first and second virtualized operating systems, said access mediators forming a first virtual machine associated with the first virtualized operating system and a second virtual machine associated with the second virtualized operating system;
- said program code instructions when executed by the computer causing the following operations to be performed at each one of the access mediators:
  - multiplexing first and second virtualized operating system communication access to an associated one of the peripheral drivers;
  - intercepting communications between the peripheral driver and a multiplexed one of the first and second virtualized operating systems;
  - verifying that the intercepted communication is compliant with security rules of access specifically defined for the multiplexed one of the first and second virtualized operating systems; and
  - permitting transmission of the intercepted communication if the intercepted communication is compliant with the defined security rules of access.

* * * * *